United States Patent
Paidimarri et al.

(10) Patent No.: US 10,965,166 B2
(45) Date of Patent: Mar. 30, 2021

(54) SIMULTANEOUS WIRELESS POWER TRANSMISSION, COMMUNICATION, AND LOCALIZATION

(71) Applicant: International Business Machines Corporation, Armonk, NY (US)

(72) Inventors: Arun Paidimarri, White Plains, NY (US); Bodhisatwa Sadhu, Peekskill, NY (US); Duixian Liu, Scarsdale, NY (US); Alberto Valdes Garcia, Chappaqua, NY (US)

(73) Assignee: International Business Machines Corporaton, Armonk, NY (US)

( * ) Notice: Subject to any disclaimer, the term of this patent is extended or adjusted under 35 U.S.C. 154(b) by 84 days.

(21) Appl. No.: 16/277,280

(22) Filed: Feb. 15, 2019

(65) Prior Publication Data

US 2020/0266669 A1 Aug. 20, 2020

(51) Int. Cl.
| | |
|---|---|
| H02J 50/23 | (2016.01) |
| G06K 7/00 | (2006.01) |
| G06K 19/07 | (2006.01) |
| H02J 50/27 | (2016.01) |

(52) U.S. Cl.
CPC ............ *H02J 50/23* (2016.02); *G06K 7/0008* (2013.01); *G06K 19/0724* (2013.01); *H02J 50/27* (2016.02)

(58) Field of Classification Search
CPC ....................................................... H02J 50/23
USPC ............................................................ 307/104
See application file for complete search history.

(56) References Cited

U.S. PATENT DOCUMENTS

| | | | |
|---|---|---|---|
| 6,069,564 | A | 5/2000 | Hatano et al. |
| 6,745,008 | B1 | 6/2004 | Carrender et al. |
| 7,091,860 | B2 | 8/2006 | Martinez de Velasco Cortina et al. |
| 7,873,326 | B2 | 1/2011 | Sadr |

(Continued)

FOREIGN PATENT DOCUMENTS

| | | |
|---|---|---|
| WO | 2009/117604 A1 | 9/2009 |
| WO | 2015/084555 A1 | 6/2015 |

OTHER PUBLICATIONS

Ali, M., et al., "A New Circularly Polarized Rectenna for Wireless Power Transmission and Data Communication", IEEE Antennas and Wireless Propogation Letters, Feb. 2005, pp. 205-208, vol. 4.

(Continued)

*Primary Examiner* — Joseph Chang
(74) *Attorney, Agent, or Firm* — Scully, Scott, Murphy & Presser, P.C.; Daniel P. Morris

(57) ABSTRACT

A radio frequency identification (RFID) system may include a plurality of RFID readers and RFID tags. A RFID reader may include an antenna configured to operate at a first frequency and transmit a first beam of a first beam width to the plurality of RFID tags. The RFID antenna may further include an antenna array including a plurality of antennas configured to operate at a second frequency. The antenna array may be configured to transmit a second beam of a second beam width to the plurality of RFID tags. The RFID reader may receive backscatter signals and tag data from the plurality of RFID tags. The RFID reader may locate the plurality of RFID tags based on the backscatter signals and a direction of the second beam. The RFID reader may generate a 3D map of the tag data based on the locations of the plurality of RFID tags.

20 Claims, 6 Drawing Sheets

(56) References Cited

U.S. PATENT DOCUMENTS

| | | | |
|---|---|---|---|
| 8,217,760 B2 | 7/2012 | Wild et al. | |
| 8,294,554 B2 | 10/2012 | Shoarinejad et al. | |
| 8,461,817 B2 | 6/2013 | Martin et al. | |
| 9,153,998 B2 | 10/2015 | Mayo | |
| 9,262,912 B2 | 2/2016 | Wild et al. | |
| 9,291,699 B2 | 3/2016 | Sadr | |
| 2007/0191074 A1 | 8/2007 | Harrist et al. | |
| 2007/0298846 A1 | 12/2007 | Greene et al. | |
| 2008/0150691 A1* | 6/2008 | Knadle | G06K 7/10346 340/10.1 |
| 2008/0157972 A1 | 7/2008 | Duron et al. | |
| 2008/0227478 A1 | 9/2008 | Greene et al. | |
| 2010/0060424 A1 | 3/2010 | Wild et al. | |
| 2011/0169607 A1 | 7/2011 | Paulson | |
| 2013/0201003 A1* | 8/2013 | Sabesan | G01S 13/878 340/10.1 |
| 2013/0299593 A1 | 11/2013 | Glidden, III | |
| 2016/0359378 A1 | 12/2016 | Kuhn et al. | |
| 2017/0286730 A1 | 10/2017 | Sadr | |
| 2018/0253679 A1 | 9/2018 | Chritz et al. | |
| 2018/0331581 A1 | 11/2018 | Hosseini | |

OTHER PUBLICATIONS

Trotter, M.S., et al., "Multi-Antenna Techniques for Enabling Passive RFID Tags and Sensors at Microwave Frequencies," 2012 IEEE International Conference on RFID (RFID), Apr. 3-5, 2012, pp. 1-7.

Karmakar, N.C., "Tag, You're It", IEEE Microwave Magazine, Jul. 2016, pp. 64-74.

Huang, Y., et al., "Active RFID location system based on time-difference measurement using a linear FM chirp tag signal", 2008 IEEE 19th International Symposium on Personal, Indoor and Mobile Radio Communications, Sep. 15-18, 2008, pp. 1-5.

Yang, G., et al., "Multi-Antenna Wireless Energy Transfer for Backscatter Communication Systems", arXiv:1503.04604v1, Mar. 16, 2015, pp. 1-30.

List of IBM Patents or Patent Applications Treated as Related, dated Feb. 15, 2019, 2 pages.

Office Action dated Jul. 20, 2020 received in U.S. Appl. No. 16/277,273. 16 pages.

* cited by examiner

SIMULTANEOUS WIRELESS POWER TRANSMISSION, COMMUNICATION, AND LOCALIZATION

BACKGROUND

The present application relates generally to wireless power and communication. In one aspect, the present application relates more particularly to communications between tag readers and tags.

Radio frequency identification (RFID) reader and tags employ wireless technology for communications and power delivery or power harvesting. In general, a RFID reader propagates or emits signals to an RFID tag, for example, to obtain information or data from the tag. The RFID tag, which can be attached to an object, may receive the emitted signal and communicate its data to the reader. In this way, RFID systems can be used for purposes of locationing, monitoring or tracking of objects. Some RFID tags may utilize electromagnetic wave backscatter to communicate tag data to the reader.

SUMMARY

In some examples, a radio frequency identification (RFID) system is generally described. The system may include a radio frequency identification (RFID) tag and a radio frequency identification (RFID) reader. The RFID reader may provide an antenna and an antenna array. The antenna may be configured to operate at a first frequency. The antenna may be further configured to transmit a first beam of a first beam width to the RFID tag. The antenna array may provide at least one antenna. The at least one antenna among the antenna array may be configured to operate at a second frequency. The antenna array may be configured to transmit a second beam of a second beam width to the RFID tag. The antenna array may be further configured to receive backscatter signals of the second beam. The antenna array may be further configured to receive tag data from the RFID tag.

In some examples, a radio frequency identification (RFID) reader is generally described. The RFID reader may provide an antenna and an antenna array. The antenna may be configured to operate at a first frequency. The antenna may be further configured to transmit a first beam of a first beam width to a RFID tag. The antenna array may provide at least one antenna. The at least one antenna among the antenna array may be configured to operate at a second frequency. The antenna array may be configured to transmit a second beam of a second beam width to the RFID tag. The antenna array may be further configured to receive backscatter signals of the second beam. The antenna array may be further configured to receive tag data from the RFID tag.

In some examples, a method of operating radio frequency identification (RFID) system is generally described. The method may include transmitting, by a radio frequency identification (RFID) reader, a first beam of a first beam width at a first frequency to a plurality of radio frequency identification (RFID) tags. The method may further include transmitting, by the RFID reader, a second beam of a second beam width at a second frequency to a particular RFID tag among the plurality of RFID tags. The second beam may be directed towards the particular RFID tag. The second beam width may be less than the first beam width. The second frequency may be greater than the first frequency. The method may further include receiving, by the RFID reader, backscatter signals of the second beam. The method may further include receiving, by the RFID reader, tag data from the particular RFID tag.

Further features as well as the structure and operation of various embodiments are described in detail below with reference to the accompanying drawings. In the drawings, like reference numbers indicate identical or functionally similar elements.

DETAILED DESCRIPTION

Figure 1:
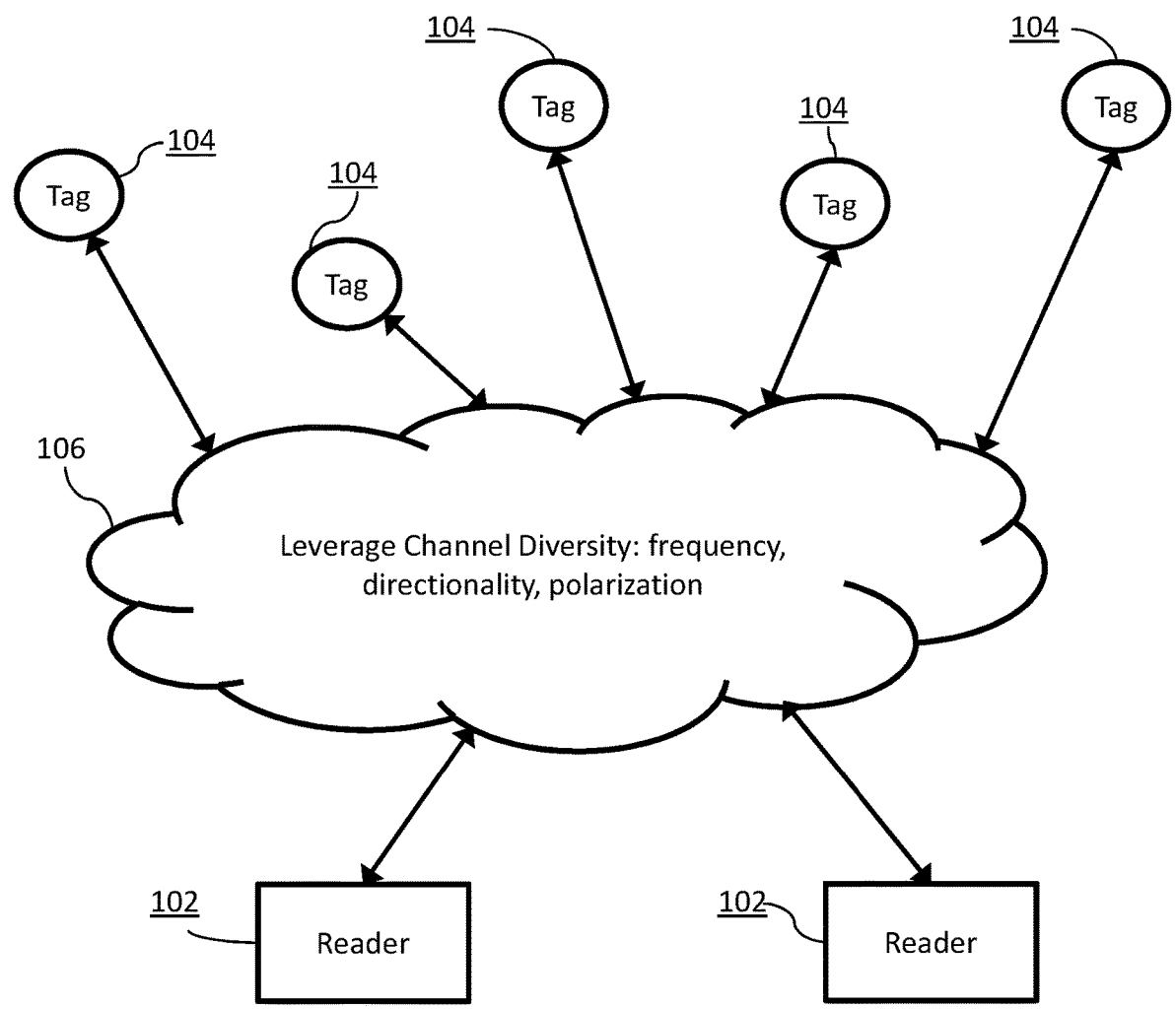
FIG. 1 is a diagram showing architecture of a reader-tag technology in one embodiment.

The wireless channel has various diversity features that interact to set an operating region's characteristics such as distance, data rate, throughput, sensing and locationing. Diversity in wireless channel, for example, may result from frequency, antenna polarization and directionality of signals or waves and other objects in the environment. Circuit design can provide additional optimization variables through modes for varying power consumption, bandwidth and data rates.

Methods, systems and devices are disclosed in embodiments, which leverage channel diversity to improve performance of a reader-tag system and enable simultaneous power transmission, communication, and localization operations. In some embodiments, a reader design may be provided that operates with multiple antennas and with multiple degrees of freedom, and protocols can be provided, which leverage the diversity to enhance a system operation.

In some embodiments, methods, systems and devices may employ various diverse features of the wireless channel to enhance one or more of: power delivery, communications, and localization. Different amounts of power may be delivered from different antennas through different channels. For instance, diversity of channel and circuit may be utilized by implementing multiple different antennas on the reader. In some embodiments, the reader may implement beamforming techniques to direct power being transmitted and communications through the different channels. In some embodiments, antenna backscatter may be used for various applications, such as, localization of tags in a three-dimensional (3D) space and mapping of sensor data received from tags.

In an example embodiment, a tag may have multiple antennas. Each antenna in a tag can be tuned for a different operating region (frequency, polarization, bandwidth, range and power level), enabling or allowing a reader-tag system to leverage wireless channel diversity for improved performance, locationing and/or other improvements. An embodiment of a reader-tag system design can include multiple radio frequency (RF)-to-direct current (DC) converters that combine the DC power output such that when no power is available on a given port, the converter contributes no loading, and each converter's interface allows backscatter based communication. In some embodiments, a generalized energy collected active radio frequency identification (RFID) operation in conjunction with multiple antennas, or other battery and energy harvesting techniques may be provided. In general, RFID operations may be improved in terms of range, robustness and flexibility of data and power delivery.

In an example embodiment, a reader may have multiple antennas. The reader may implement both transmitting and receiving functions, and beamforming is supported for both transmitting and receiving functions. Each antenna of the reader may operate at respective frequency. Two or more antennas of the reader may form an antenna array, and the antenna array may implement beamforming to focus or direct signal and/or energy transmission to particular tags. For example, a first antenna of the reader that operates at a first frequency may form a broad beam to broadcast baseline power and communications to a plurality of tags. An antenna array that includes two or more antennas of the reader operating at a second frequency may form a narrow directional beam to direct additional power and communication to the tags. The broad beam formed by the first antenna enables RFID time division multiplexed communications and provides baseline power to the tags. In a transmission mode, the narrow directional beam formed by the antenna array of the reader provides additional power to the tags, and provides spatial multiplexing of data, in specific directions (e.g., direction of the narrow beam). The additional power provided by the narrow beam to the tags may allow the tags to perform relatively high power computations such as encryption and secure authentication protocols. In a receiving mode, the antenna array of the reader may receive backscatter signals from the specific direction of the narrow beam, such that localization functions (e.g., to locate the tags in 3D space) may be implemented by the reader. By being capable of implementing both transmitting and receiving modes, the reader may physically locate the tags in three-dimensional (3D) space using the direction of the narrow beam and amplitudes of the received backscatter signals, receive sensor data from the tags, create 3D mappings of the sensor data, and track the locations of the tags in 3D space over time.

FIG. 1 is a diagram showing architecture of a reader-tag technology in one embodiment. One or more RFID reader devices 102 (also referred to herein as a reader) may communicate with one or more RFID tag devices 104 (also referred to herein as a tag) over a wireless communications network or channel 106, where there are multiple degrees of freedom and communications can occur with diverse characteristics such as frequency of operation, directionality of antennas and polarization in which the antennas communicate or radiate waves. The diverse characteristics are variables which result from a goal of a given environment (e.g., amount of range in terms of distance, the data that can be communicated, throughput of the network). The devices 102, 104 are configured to leverage channel diversity such as frequency, directionality and polarization, such that power delivery and/or communication link budget can be optimized.

An RFID system, for example, can be used in locationing, identifying objects, and other purposes. An RFID reader 102 may include one or more antennas and associated circuitry, such as transceivers. An antenna can be a coil, and can receive and transmit power wirelessly. Generally, the reader's antenna(s) may emit or transmit communication in the form of energy such as electromagnetic waves or signals, for example, generated at the reader's transceiver. The tag's antenna may receive the emitted signals and may communicate data signals back to the reader. In one aspect, an ability to vary different operating properties or regions in communicating between a reader and a tag is provided, which allows for optimization in communications.

Figure 2:
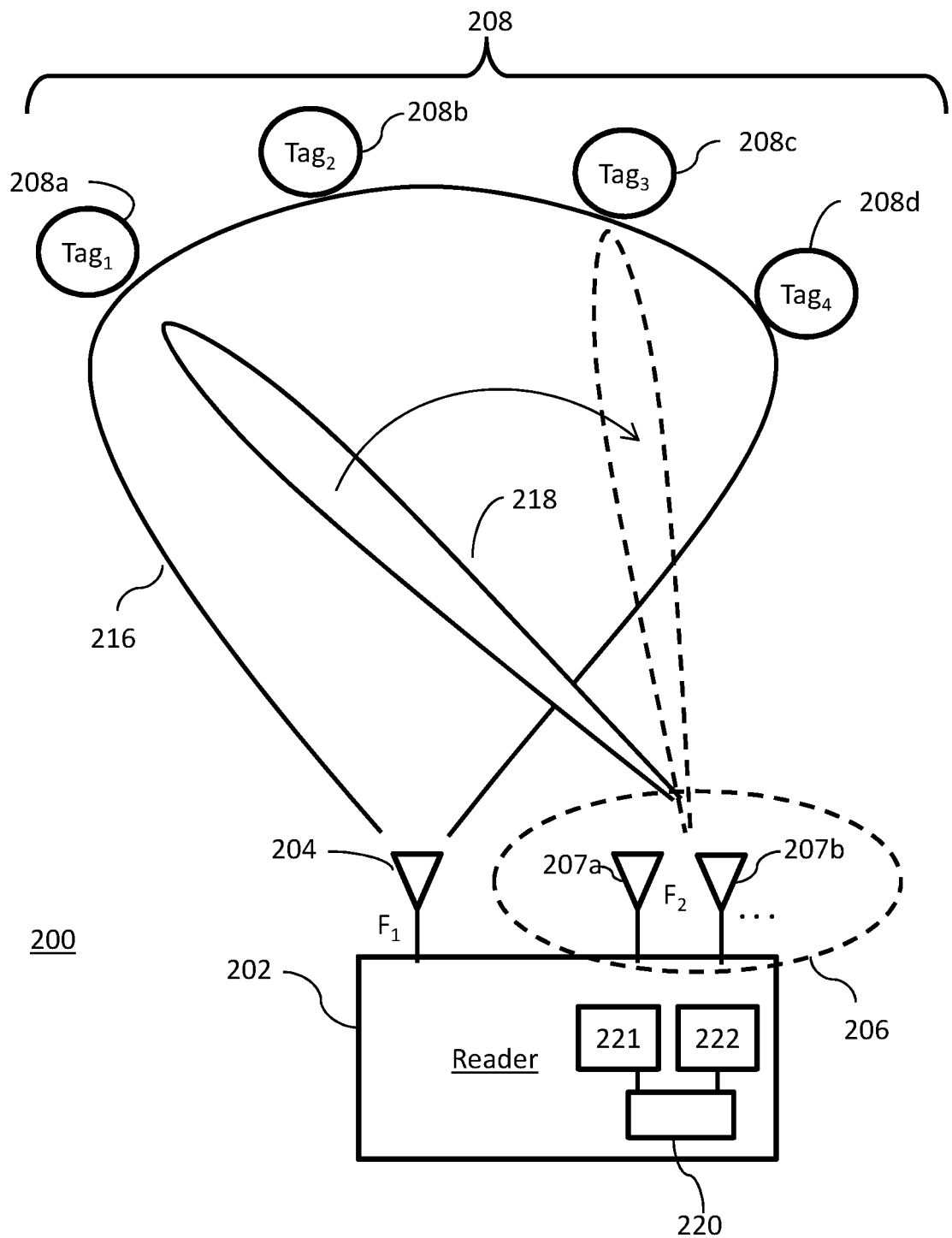
FIG. 2 is a diagram illustrating an overview of a reader-tag system including a reader device and tag devices in one embodiment.

FIG. 2 is a diagram illustrating an overview of a RFID reader-tag system 200 ("system 200") including a reader device ("reader") and tag devices ("tags") in one embodiment. A RFID reader device 202 may include or provide an antenna 204 and an antenna array 206 including one or more antennas such as 207a, 207b. In some example embodiments, the reader 202 may include or provide additional antennas and/or antenna arrays. The number and type of antennas on the reader 202, or the antenna array 206, may depend on attribute of the reader 202 such as cost, power, size, and/or other attributes. In some examples, the antennas 204, 207a, 207b may be multi-band antennas configured to operate at multiple frequencies. The antennas 204, 207a, 207b and associated circuitry (e.g., transceivers) may support (e.g., may be operating at) different frequencies and/or antenna polarization and have the ability to deliver power to, and communicate with, tags 208a, 208b, 208c, 208d (collectively "tags 208"). In some examples, the antennas 204, 207a, 207b may also support reception of tag data from the tags 208. Multiple tags, such as tags 208 may be placed in a field, and each tag among tags 208 may be configured with multiple antennas and circuitry that support a respective antenna. The antennas and associated circuitry of the tags can be co-optimized to receive signals or waves (e.g., electromagnetic waves) in different frequencies and/or polarizations. For example, each of the antennas among each tag may have an ability to receive power from the reader device 202 and communicate with the reader device 202 at any of the frequencies that the reader device 202 operates in and the polarizations the reader device 202 operates in. In some examples, a first antenna of the reader 202 may transmit a beam, and a second antenna of the reader 202 may receive backscatter signals of the beam transmitted from the first antenna. Implementing the reader device 202 and the tags 208, which can operate with diverse channel characteristics (e.g., multiple frequencies and multiple polarizations), enables the RFID reader-tag system 200 to operate with improved range and/or robustness, for instance, the system configuration choice chosen or optimized depending on the diverse channel characteristics for a given environment. For instance, having an RFID reader-tag system with one or more readers and one or more tags configured with an ability to operate in diverse characteristics, a characteristic can be selected for a reader or tag to operate in, depending on a given goal and/or given environment.

As an example, wireless channel diversity can be utilized to enable simultaneous power transmission from the reader 202 to tags 208, communication between the reader 202 and the tags 208, and localization of the tags 208 in 3D space. The utilization of the different channel characteristics can lead to a reader-tag system operation with higher reliability, longer range and/or higher net throughput. In some embodiments, a reader-tag system may assign a function (e.g., mode of operation) to a given channel interface (e.g., an antenna among multiple antennas configured in a tag) depending on a desired implementation of the reader-tag system. For example, the reader 202 may be assigned to a function or mode of operation, such as a transmitting mode and/or a receiving mode. The transmitting mode of the reader 202 may include implementations of communication and power delivery to the tags 208. The communication and power delivery may be initiated by the antenna 204 and/or the antenna array 206 of the reader 202. The receiving mode of the reader 202 may include implementations of localization of the RFID tags, tracking the RFID tags over time, and construction of mappings of sensor data received from the RFID tags. The functions implemented in the receiving mode may utilize the antenna array 206 to receive backscatter signals. The reader 202 may include processing components to determine locations of the tags based on the received backscatter signals, and create mappings of sensor data received from the RFID tags using the determined locations of the RFID tags.

In an example embodiment, the localization, or determination of the RFID tags' locations, is based on the antenna array 206, where the antenna array 206 may be a phased array antenna. A transceiver that includes or provides the antenna array 206, or is coupled to the antenna array 206, may also include a plurality of phase shifters, and each phase shifter may be connected to each antenna among the antenna array 206. In some examples, the reader 202 may further include or provide a processing component, such as processors, or a microprocessor 220, connected to the transceiver including the antenna array 206. The microprocessor 220 may be configured to control the phase shifters of the antennas among the antenna array 206 to change the direction of the beam 218. In some examples, the microprocessor 220 may be remote from the reader 202 (e.g., the microprocessor 220 may be a component of another device). Thus, the reader 202 may be configured to steer the direction of the narrow beam 218 using the antenna array 206 and associated circuitry or components (e.g., the transceiver, phase shifters, and microprocessor 220). Steering the narrow 218 beam at the second frequency $F_2$ to a particular RFID tag among the plurality of RFID tags may include using beamfinding algorithms, which may be part of instructions 124 and stored in the memory 122. The steering allows the reader 202 to perform a scan in the field including the tags 208, such as steer the beam 218 to each tag among tags 208, to locate the tags 208 in 3D space. In examples where the backscatter signals from the tags 208 reach the reader 202 directly (e.g., without any reflection), the scanning based on the steering allows the reader to determine if any tags are located in the direction of the transmitted beam 218 and the associated backscatter signals received at the reader 202. If a tag is located in the direction of the transmitted beam 218, the amplitude of the corresponding backscatter signal may indicate a distance of the located tag from the reader 202. Thus, the distance of the located tag from the reader 202, and a direction in which the tag is located, may be used by the reader to determine an exact location of the tag in 3D space, without a need for the tag to respond with any location information.

In examples where the backscatter signals are reflected before reaching the reader 202, the microprocessor 220 may implement one or more signal processing engines to account for any occurrence of reflections of the backscatter signals. For example, a first signal processing engine 221 may determine the received signal strength indicator (RSSI) of backscatter signals being received at the reader 202, and a second signal processing engine 222 may determine an angle of arrival (AOA) of the backscatter signals being received at the reader 202. The second signal processing engine takes the reflections into account when determining the AOA and thus is able to locate the tag taking reflections into consideration. The first signal processing engine 221 may send the determined RSSI to the microprocessor 220, and the second signal processing engine 222 may send the determined AOA to the microprocessor 220. The signal processing engines 221, 222 may also be implemented in examples where the backscatter signals do not experience reflections.

The microprocessor 220 may use the RSSI and AOA information from each of the tags 208 to create a 3D map of the tags 208 and a 3D map of information (e.g., sensor measurements) included in tag data received from the tags 208. For example, if the tags 208 include temperature sensors, the tag data received from the tags 208 may include sensor data such as temperature readings. In some examples, the microprocessor 220 may generate a 3D map indicating physical locations of the tags 208. The microprocessor 220 may also derive another 3D map of the sensor data using the 3D map indicating physical locations of the tags 208. The microprocessor 220 may implement image processing algorithms, or map generation software, to generate a 3D temperature map using the tag data and the locations of the tags 208. In some examples, the microprocessor 220 may send the tag data and the locations of the tags 208 to another processor, or device, in order for the processor to generate the 3D temperature map. Other examples of sensor data may include chemical concentration, radioactive activity, humidity, electric or magnetic field, and/or other types of sensor data that may be obtain from sensor(s) coupled to the RFID tags. The functionality of the reader 202 to locate the tags 208 may avoid a need for tags 208 to have location sensing capabilities.

To implement simultaneous power delivery, communication, and localization, the reader 202 may implement beamforming techniques to control an amount of power being delivered to each tag and to direct transmission of signals to the tags 208. For example, as shown in FIG. 2, the antenna 204 may operate at a first frequency $F_1$, where $F_1$ may be a relatively low frequency (e.g., less than 6 GHz). The antennas of the antenna array 206 may operate at a second frequency $F_2$, where $F_2$ may be a relatively high frequency. (e.g., greater than 15 GHz). In some examples, $F_2$ may be a mm-wave frequency in order to be able to develop a reader phased array with many antennas (e.g., the antenna array 206) in a small form factor. A beam 216 formed by the antenna 204, at frequency $F_1$, may be a broad beam that covers a region spanning multiple RFID tags, such as tags 208. The broad beam 216 facilitates delivery of RFID power to the tags 208 within the coverage area of the broad beam 216. Transmission of the broad beam 216 may also facilitate time division multiplexing to transmit and receive independent signals or data over a common channel. A narrow beam 218 formed by the antenna array 206, at frequency $F_2$, may be a narrow beam that directs or focuses additional power and/or signals in a particular direction. A beam width of the broad beam 216 may be greater than a beam width of the narrow beam 218. In the example shown in FIG. 2, the narrow beam 218 may be directed towards the tag 208a. Thus, the tag 208a may receive both power from the beam 216 and additional power provided by the beam 218, and the tags 208b, 208c, 208d receives power from the broad beam 216. The reader 202 may change a direction of the beam 218 such that the additional power may be delivered to tags other than tag 208. In some examples, the antenna array 206 may be an electronically steered antenna array or a mechanically steered directional antenna. The reader 202 may steer the antenna array 206 to change the direction of the beam 218. In the example shown in FIG. 2, the reader 202 may steer the beam 218 from being directed towards the tag 208a to a direction directed towards the tag 208c. Steering the antenna array 206 may include altering a phase and/or an amplitude of each antenna among the antenna array 206 to direct the narrow beam 218 in a desired direction. In some examples, the antenna array 206 may transmit multiple narrow beams 218 at frequency $F_2$ to multiple tags among the system 200, simultaneously, using spatial multiplexing techniques in order to transmit independent and separately encoded data streams to different tags.

In some examples, the broad beam 216 may be used, such as by the RFID reader 202, to enumerate the RFID tags and to determine coarse location (or direction) information. For example, the microprocessor 220 may use a receipt time of the broad beam at the RFID tags (which may be provided by the RFID tags) to determine an approximate location and direction of the RFID tags (e.g., a range of distances, a range of angles, a particular area of vicinity, etc.). The reader 202 may use the approximated information as initial locations of the RFID tags, and use information associated with the narrow beam 218 (e.g., RSSI, amplitude, AOA, of backscatter signals) to refine the approximated information (e.g., to exact distances, angles, or a narrower range of distances and angles). By using the broad beam 216 to obtain initial information, the amount of operations performed by the reader 202 to locate the RFID tags may be reduced due to initializing the tag location process by using both the broad beam 216 and the narrow beam 218. This embodiment to operate the reader 202 may improve data rate, throughput, power consumption, efficiency, and/or other performance factors of the RFID reader 202.

In some examples, other modes of operation may include performance optimization modes, such as optimizing power delivery or communication or a combination of power delivery and communication. For example, if optimal (e.g., highest) power delivery is desired (mode of operation), both the antenna 204 and the antenna array 206 of the reader 202 may be activated to deliver RFID power (from antenna 204) and the additional power (from antenna array 206) to the RFID tags. As another example, if high power applications are not required (e.g., encryption or authentication, localization), the antenna 204 may be activated to provide RFID power via broad beam to the RFID tags and the antenna array 206 may be deactivated to save power consumption by the reader 202. In other examples, if a desired implementation of the reader-tag system involves high power applications such as encryption, authentication, localization, both the antenna 204 and the antenna array 206 may be activated. In another example, if a desired implementation of the reader-tag system 200 involves low power applications, antenna 204 may be activated to provide power to the tags and the antenna array 206 may be activated for data transfer. By using the antenna 204 to provide power and the antenna array 206 for data transfer, the link margin of the system 200 may be increased and the range of communication may also be increased.

Figure 3:
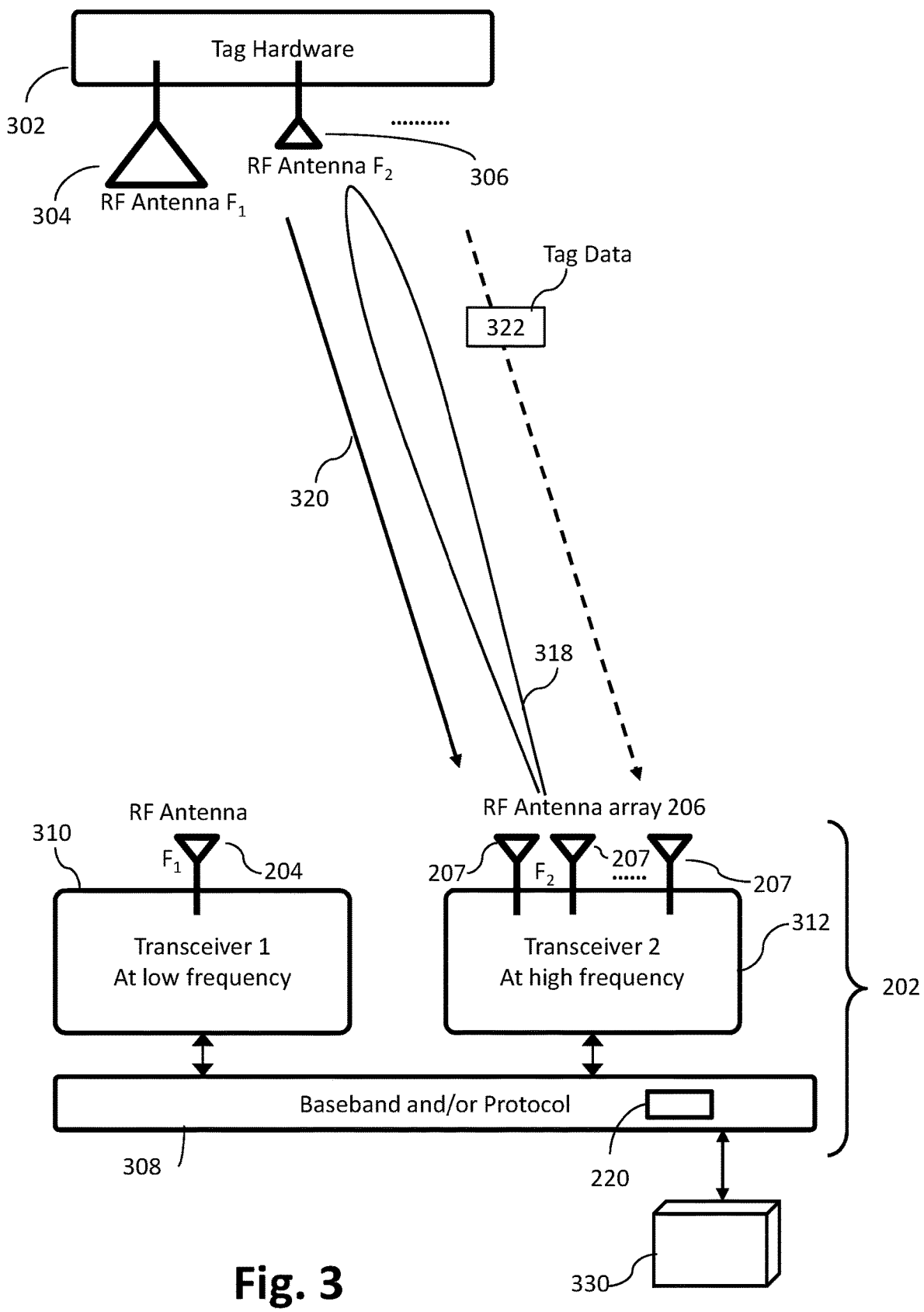
FIG. 3 is a diagram illustrating an example implementation of a reader-tag system in one embodiment.

FIG. 3 is a diagram illustrating an example implementation of a reader-tag system in one embodiment. In one embodiment, a reader (e.g., reader 202 shown in FIG. 2) may include or provide circuitry with multiple antenna interfaces. For example, the circuitry among the reader 202 may include or provide a transceiver 310 coupled to the antenna 204 (or the transceiver 310 may include the antenna 204), and a transceiver 312 coupled to the antenna array 206 ((or the transceiver 312 may include the antennas of the antenna array 206)). Other circuitry of the reader 202 may include a circuitry or processing component 308 that is configured to implement one or more signal processing engines, baseband processors, protocols, received signal strength indicator (RSSI), angle of arrival (AOA) detectors, software defined radio (SDR), software defined phase array radio (SDPAR), and/or other components, protocols, and/or techniques associated with the implementation of the reader 202. The processing component 308 may include or provide one or more custom analog or digital application specific integrated circuits (ASICs), each configured to perform specific task relating to the implementation of the reader 202. The processing component 308 may include the microprocessor 220 discussed above.

The processing component 308 may implement a first baseband processor coupled to the transceiver 310, and may implement protocols to facilitate power delivery, signal transmissions from the antenna 204 to the tags 208, and reception backscatter signals and tag data at the antenna 204. [The transceiver 310 may be implemented with a custom ASIC or a SDR among the processing component 308. The processing component 308 may implement a second baseband processor coupled to the transceiver 312, and may implement protocols to facilitate power delivery, signal transmission, digital or analog beamforming techniques, reception of backscatter signals and tag data and localization of the tags 208. The transceiver 312 may be implemented with a custom ASIC or a SDPAR among the processing component 308. The transceiver 312 may be configured to support beamforming and beam steering in both transmitting mode and receiving mode of the reader 202. In the receiving mode, the transceiver 310 may be implemented with a RSSI among the processing component 308 to measure amplitudes of backscatter signals received at the antenna array 206. In some examples, both transceivers 310, 312, may be coupled to the same baseband processor being implemented by the processing component 308. The processing component 308 may implement a common ASIC to execute synchronization protocols between the transceivers 310, 312, such that the reader may perform simultaneous power delivery, communication, and localization operations utilizing both transceivers 310, 312. In some examples, the synchronization protocols may include time division multiplexing techniques. In some examples, in the event that different frequencies are being used for power transmission and data communication, synchronization may not be implemented.

In an example embodiment, the reader 202 may send commands to the tag 302 to change power harvesting configurations of the tag 302 to notify changes to the reader 202, such as changes of configurations of the reader 202, or if the reader 202 moves to a new physical location, and/or other changes. In another example embodiment, the reader 202 may send commands to the tag 302 to indicate which antenna the tag 302 shall use to respond to the signal transmitted via the beam 318. For example, by transmitting signals using the beam 318 from the antenna array 206 at frequency $F_2$, the tag 302 may determine that the antenna 306, which operates at frequency $F_2$, shall be used to respond to the reader 202.

In an example shown in FIG. 3, the antenna array 206 may transmit a narrow beam 318 to a tag 302 (which may be among the tags 208 in FIG. 2). The tag 302 may include or provide at least an antenna 304 and an antenna 306, where the antenna 304 is configured to receive signals at frequency $F_1$ and the antenna 306 is configured to receive signals at frequency $F_2$. The narrow beam 318 may be emitted by the antenna array 206 in a direction directed towards the tag 302. The antenna 306 of the tag 302 may capture or receive the signals transmitted through the narrow beam 318 and may send a response, such as tag data 322, to reader 202. The antenna array 206 of the reader 202 may receive the tag data 322. Further, the transmission of the narrow beam 318 from the antenna array 206 may create backscatter signals 320 that travel in an opposite direction from the direction of the narrow beam 318. The antenna array 206 may receive the backscatter signals 320. The tag data 322 and the backscatter signals 320 received at the antenna array 206 may flow to the transceiver 312. In some examples, the transceiver 312 may perform demodulation on the tag data 322 and the backscatter signals 320 to generate information readable by processing units such as the baseband processors among the processing component 308.

The processing component 308 may receive the tag data 322 and may determine an amplitude of the backscatter signals 320. The amplitude of the backscatter signals 320, along with the direction of the narrow beam 318, may be used to determine a location of the tag 302 in 3D space. For example, if antenna array 206 is steered to transmit the beam 318 in a direction X, the amplitude of the backscatter signals 320 indicates a distance between the tag 302 and the reader 202 in direction X. Thus, locations of tags may be determined by using one reader device, instead of using multiple reader devices, and the need to perform computing tasks such as trilateration techniques may be reduced. By implementing the reader 202, the tag 302 may be tracked in 3D space over time without a need to use multiple readers and perform additional computing tasks. In some examples, the reader 202 may send the tag data 322 and the amplitude of the backscatter signals 320 to a computer device 330, where the computer device 330 may be a part of the processing component 308 or may be remote from the reader 202, and the computer device 330 may determine the location of the tag 302 using the amplitude of the backscatter signals 320, and may also create a 3D map of sensor data using the tag data 322 and the determined location of the tag 302.

The reader 202 may be implemented to track location of the tags over time. For example, the reader 202 may steer the antenna array 206 in a sweeping motion periodically to locate the tags over time. Such tag location tracking provides data for various analysis, such as analyzing movement of objects that may be attached to the tags. Further, the tracked tag locations may facilitate generation of a map of objects being attached to the tags.

Figure 4:
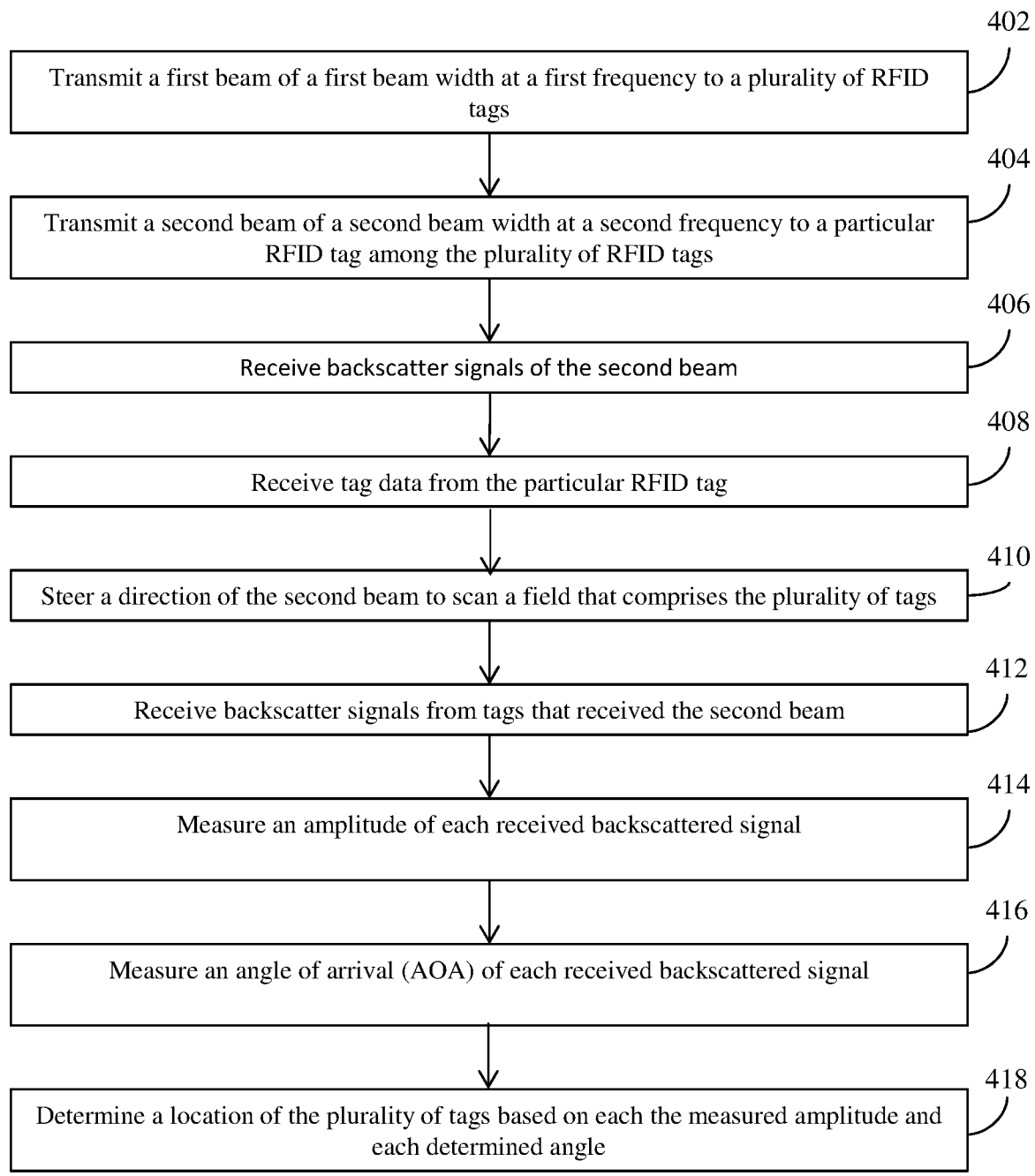
FIG. 4 is a flow diagram illustrating a process that can be implemented by a reader-tag system to perform simultaneous power delivery, communication, and localization in one embodiment.

FIG. 4 is a flow diagram illustrating a process that can be implemented by a reader-tag system to perform simultaneous power delivery, communication, and localization in one embodiment. An example process may include one or more operations, actions, or functions as illustrated by one or more of blocks 402, 404, 406, 408, 410, 412, 414, 416, and/or 418. Although illustrated as discrete blocks, various blocks may be divided into additional blocks, combined into fewer blocks, eliminated, or performed in parallel, depending on the desired implementation.

The process in FIG. 4 may be performed by a radio frequency identification (RFID) reader, which may include multiple antennas coupled with associated circuitry. At block 402, the RFID reader transmits a first beam of a first beam width at a first frequency to a plurality of RFID tags. At block 404, the RFID reader transmits a second beam of a second beam width at a second frequency to a particular RFID tag among the plurality of RFID tags. The second beam is directed towards the particular RFID tag, the second beam width is less than the first beam width, and the second frequency is greater than the first frequency. At block 406, the RFID reader receives backscatter signals of the second beam. At block 408, the RFID reader receives tag data from the particular RFID tag. At block 410, the RFID reader steers a direction of the second beam to scan a field that comprises the plurality of tags. At block 412, the RFID reader receives backscatter signals from tags that received the second beam. At block 414, the RFID reader measures an amplitude of each received backscattered signal. At block 416, the RFID reader measures an angle of arrival (AOA) of the received backscattered signal. At block 418, the RFID reader determines a location of the plurality of tags based on the measured amplitudes and determined angles.

Figure 5A:
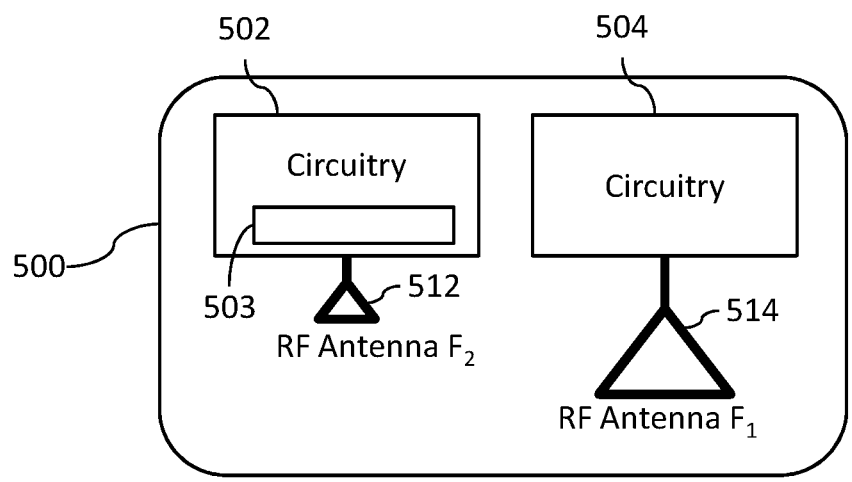
FIG. 5A is a diagram illustrating a tag configuration in one embodiment.
Figure 5B:
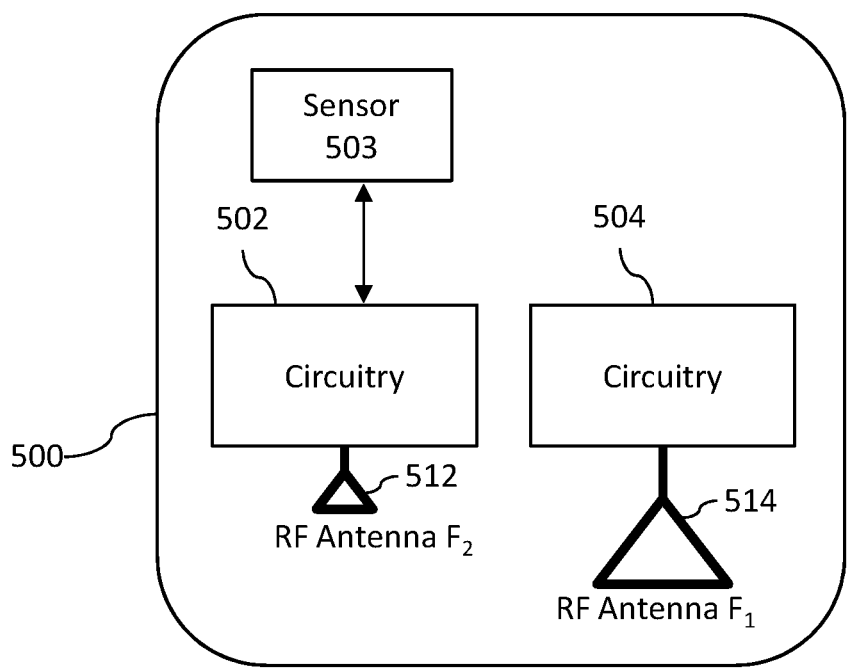
FIG. 5B is a diagram illustrating a tag configuration in one embodiment.

FIG. 5A is a diagram illustrating a tag configuration in one embodiment. FIG. 5B is a diagram illustrating a tag configuration in another embodiment. A tag 500 in accordance with the present disclosure may include or provide circuitry with multiple antenna interfaces. For example, the tag 500 may include or provide a circuitry 502 coupled to an antenna 512, and may include a circuitry 504 coupled to an antenna 514. In some examples, the antennas 512, 514 may be a part of the circuitry 502, 504, respectively. In some examples, the circuitry 502, 504 may include or provide one or more RF-to-DC converters connected in parallel. The antennas 512, 514 may be antennas or antenna interfaces of the RF-to-DC converters. The circuitry 502 and the antenna 512 may be configured to operate at the frequency $F_2$, and the circuitry 504 and the antenna 514 may be configured to operate at the frequency $F_1$. In some examples, the antennas 512, 514 of the tag 500 may be tuned for a different operating region (e.g., frequency, polarization, bandwidth, range and power level). Such tuning enables a RFID reader-tag system that includes the tag 500 to leverage the channel diversity for improved performance and to enable location, and/or other functions. Thus, the antennas 512, 514 of the tag 500 and their associated circuitry 502, 504 may be optimized for different transmitter beam configurations such as frequencies, polarizations, radiation patterns, and/or other properties. Further, by transmitting beams tuned to different characteristics (e.g., frequency) to a reader, the reader may locate the tag based on the characteristic of the beam transmitted from the tag.

In the tag configuration illustrated in FIG. 5A, a sensor 503 may be integrated or embedded in the circuitry 502. In the tag configuration illustrated in FIG. 5B, the sensor 503 may be coupled to the circuitry 502, and in some examples, may be remote from the tag 500. The sensor 503 may be, for example, a temperature sensor, a chemical concentration detector, radioactive activity detector, humidity sensor, electric or magnetic field sensors, and/or other types of sensors. Sensor data collected by the sensor 503 may be transmitted to a RFID reader in response to receipt of power and/or signals from the RFID reader. In some examples, the tag 500 may select which antenna among antenna 512, 514 to perform the task of transmitting the sensor data collected by the sensor 503 to the RFID reader.

The present disclosure does not limit the number of antenna interfaces configured for a tag device or a reader device. In one aspect, factors such as an underlying circuit area, tag size, silicon integrated circuit (IC) size (e.g., due to number of connections needed for external antennas and the required pads), size of solution (e.g., antenna designs, operable interaction between antennas), cost (e.g., due to size and/or number of layers in an interposer or package technology to implement the antennas), can be considered. In one aspect, multi-band antennas that operate at multiple frequencies can complement a given antennas interface.

Figure 6:
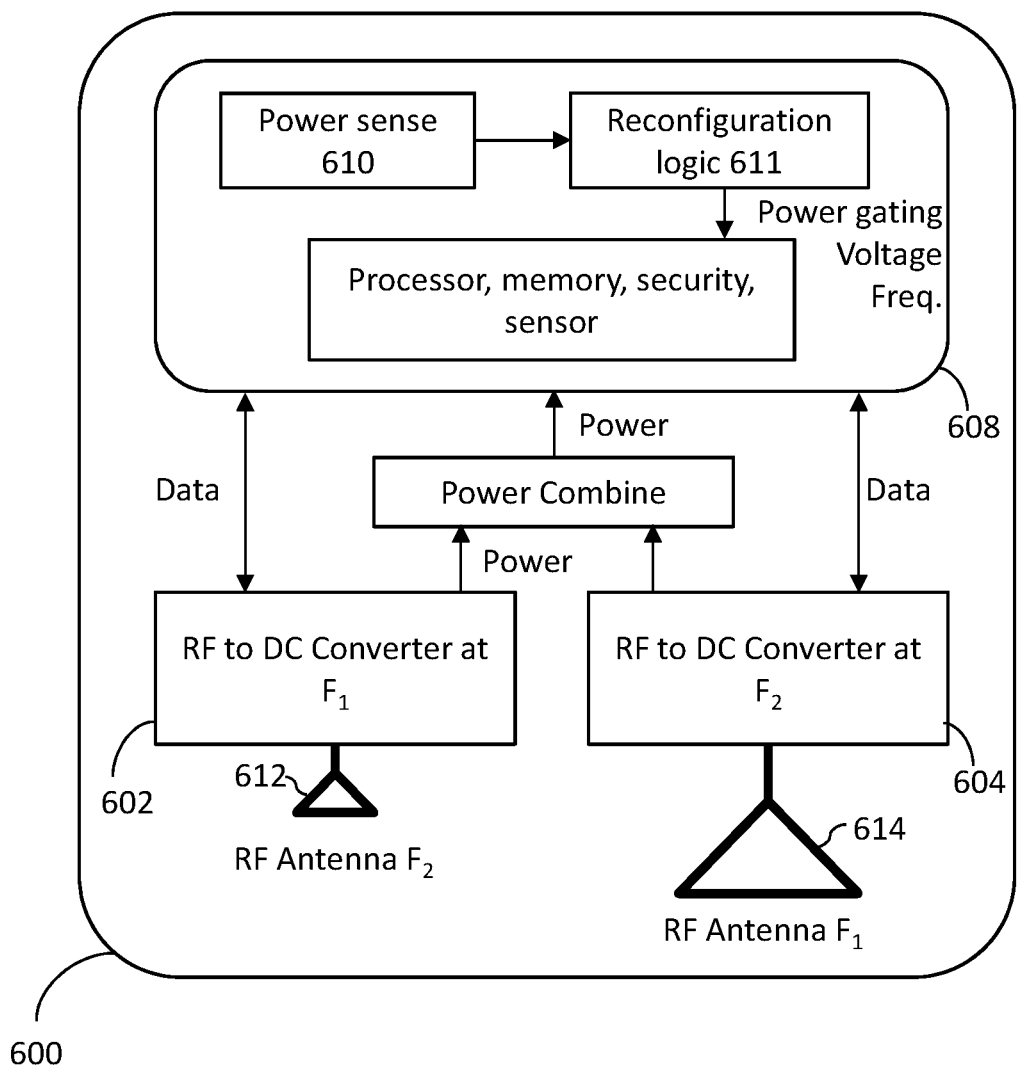
FIG. 6 is a diagram illustrating a tag configuration in one embodiment.

FIG. 6 is a diagram illustrating a tag configuration in one embodiment. In an example, a tag 600 in accordance with the present disclosure may include circuitry with multiple antenna interfaces. For example, the tag 600 may include or provide a RF to DC converter 602 and a RF to DC converter 604. The RF to DC converter 602 may include an antenna or antenna interface 612 and the RF to DC converter 604 may include an antenna or antenna interface 614. The RF to DC converter 602 may be configured to operate at the frequency $F_2$, and the RF to DC converter 604 may be configured to operate at the frequency $F_1$. The antennas 612, 614 of the tag 600 may be tuned for a different operating region (e.g., frequency, polarization, bandwidth, range and power level). Such tuning enables a RFID reader-tag system that includes the tag 500 to leverage the channel diversity for improved performance and to enable location, and/or other functions. Thus, the antennas 612, 614 of the tag 600 and their associated circuitry 602, 604 may be optimized for different frequencies, polarizations, radiation patterns, and/or other properties.

The antennas 612, 614, and their associated RF to DC converter 602, 604 may be optimized for different modes of operation, for example, one or more for power, one or more for data uplink and one or more for data downlink. In one example, an antenna and associated circuitry can be chosen for data, while that antenna with another antenna can be chosen for power delivery. In some embodiments, the RF-to-DC converters 602, 604 can work with any of the modes of operation and a mode can be selected independently. In one aspect, configuration bits, antenna design and package design can decide data modes, voltage output and frequency.

The tag 600 may include or provide a processing component 608 that may include one or more components, such as hardware or software modules. For example, processing component 608 may include a baseband processor, memory, security protocols, sensors, logic blocks, integrated circuits, and/or other types of modules. As the antennas 612, 614 receive power and data from a RFID reader, the RF to DC converters 602, 604 may transmit the received power and data to the processing component 608. The processing component 608 may implemented its hardware and/or software modules to implement one or more desired applications. For example, a power sensing module 610 may be implemented to measure the amount of power received at antenna 612, 614, and may transmit the measured amount of power to a power reconfiguration logic module 611. The power reconfiguration logic module 611 may reconfigure one or more configurations of the tag 600, such as power modes, voltage levels, speeds, enabling and/or disabling of features. For example, the tag 600 may start in the lowest power mode, evaluate power availability (e.g., the measured amount of power from power sensing module 610) and then reconfigure itself based on the evaluated power availability.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system comprising:
a radio frequency identification (RFID) tag;
a radio frequency identification (RFID) reader that provides:
an antenna configured to:
operate at a first frequency;
transmit a first beam of a first beam width to the RFID tag;
an antenna array that provides at least two antennas, the at least two antennas being configured to operate at a second frequency, and the antenna array being configured to:
transmit a second beam of a second beam width to the RFID tag;
receive backscatter signals of the second beam; and
receive tag data from the RFID tag.

2. The system of claim 1, wherein the second frequency is greater than the first frequency.

3. The system of claim 1, wherein the backscatter signals and the tag data are received at a second antenna array of the RFID reader.

4. The system of claim 1, wherein the RFID reader is configured to steer a direction of the second beam.

5. The system of claim 4, wherein the antenna array is a phased array antenna, and the RFID reader is configured to steer the direction of the second beam using a plurality of phase shifters coupled to the phased array antenna.

6. The system of claim 1, wherein:
the RFID tag is among a plurality of RFID tags;
the RFID reader is among a plurality of RFID readers;
the antenna array is configured to:
transmit the second beam to the plurality of RFID tags;
receive backscatter signals of the second beam from the plurality of RFID tags;
receive tag data from the plurality of RFID tags;
the RFID reader provides a processor configured to:
determine locations of the plurality of RFID tags based on the received backscatter signals; and
generate a three-dimensional map of the RFID tags based on the determined locations and the tag data.

7. The system of claim 6, wherein the RFID reader provides a processor configured to:
determine a received signal strength indicator (RSSI) of the received backscatter signal;
measure an amplitude of the received backscattered signal using the determined RSSI; and
measure an angle of arrival (AOA) of the received backscattered signal, wherein the determination of the locations of the plurality of RFID tags are further based on the determined RSSI, the measured amplitude, and the measures AOA.

8. The system of claim 7, wherein the antenna array is a phased array antenna, and the processor is configured to measure the AOA based on differences between phases in which the backscatter signal is received at the at least one antenna among the phased array antenna.

9. The system of claim 6, wherein the processor is further configured to generate a three-dimensional map of sensor data among the tag data based on at least one of the determined locations and the three-dimensional map of the RFID tags.

10. The system of claim 1, wherein the first beam transmitted from the antenna causes at least one of:
 a broadcast of communication to a plurality of RFID tags in addition to the RFID tag;
 an implementation of time division multiplexing; and
 a supply of a baseline amount of power to the plurality of RFID tags.

11. The system of claim 1, wherein the antenna array is configured to transmit a plurality of beams of the second beam width to a plurality of RFID tags simultaneously using spatial multiplexing.

12. A radio frequency identification (RFID) reader comprising:
 an antenna coupled to a first transceiver, the antenna configured to:
  operate at a first frequency;
  transmit a first beam of a first beam width to a RFID tag;
 an antenna array coupled to a second transceiver, the antenna array provides at least two antennas, the at least two antennas among the antenna array being configured to operate at a second frequency, and the antenna array being configured to:
 transmit a second beam of a second beam width to the RFID tag;
 receive backscatter signals of the second beam; and
 receive tag data from the RFID tag.

13. The RFID reader of claim 12, wherein the second frequency is greater than the first frequency.

14. The RFID reader of claim 12, wherein the second beam width is less than the first beam width.

15. The RFID reader of claim 12, wherein the antenna array is a phased array antenna, and the RFID reader is configured to steer a direction of the second beam using a plurality of phase shifters coupled to the phased array antenna.

16. The RFID reader of claim 12, further comprising a processor configured to:
 determine a received signal strength indicator (RSSI) of the received backscatter signal;
 measure an amplitude of the received backscattered signal using the determined RSSI; and
 measure an angle of arrival (AOA) of the received backscattered signal.

17. The RFID reader of claim 12, wherein the first beam transmitted from the antenna causes at least one of:
 a broadcast of communication to a plurality of RFID tags in addition to the RFID tag;
 an implementation of time division multiplexing; and
 a supply of a baseline amount of power to the plurality of RFID tags.

18. The RFID reader of claim 12, wherein the antenna array is configured to transmit a plurality of beams of the second beam width to a plurality of RFID tags simultaneously using spatial multiplexing.

19. A method comprising:
 transmitting a first beam of a first beam width at a first frequency to a plurality of radio frequency identification (RFID) tags, the first beam being formed by an antenna of a device;
 transmitting a second beam of a second beam width at a second frequency to a particular RFID tag among the plurality of RFID tags, the second beam being formed by an antenna array of the device, the antenna array having at least two antennas, wherein the second beam is directed towards the particular RFID tag, the second beam width is less than the first beam width, and the second frequency is greater than the first frequency;
 receiving backscatter signals of the second beam; and
 receiving tag data from the particular RFID tag.

20. The method of claim 19, further comprising:
 steering a direction of the second beam to scan a field of the plurality of tags;
 receiving backscatter signals from tags that received the second beam;
 measuring an amplitude of the received backscattered signal;
 measuring an angle of arrival (AOA) of the received backscattered signal; and
 determining a location of the plurality of tags based on the measured amplitude and determined angle.

* * * * *